(12) United States Patent
Evans

(10) Patent No.: US 6,282,983 B1
(45) Date of Patent: Sep. 4, 2001

(54) CONNECTING ROD STRUCTURE AND ATTACHMENT TO WRIST PIN

(76) Inventor: Mark M. Evans, 67 Welts St., Mt. Clemens, MI (US) 48043

( * ) Notice: Subject to any disclaimer, the term of this patent is extended or adjusted under 35 U.S.C. 154(b) by 0 days.

(21) Appl. No.: 09/519,231

(22) Filed: Mar. 6, 2000

(51) Int. Cl.[7] .................................................... G05G 1/00
(52) U.S. Cl. ........................ 74/579 E; 74/579 R; 92/187; 123/197.3
(58) Field of Search .............................. 74/579 R, 579 E; 92/187–190, 128; 123/197.3, 197.4

(56) References Cited

U.S. PATENT DOCUMENTS

| | | | |
|---|---|---|---|
| 1,787,556 | * | 1/1931 | Smith .................................. 74/579 R |
| 3,695,150 | * | 10/1972 | Salzmann .............................. 92/169 |
| 3,789,743 | * | 2/1974 | Sihon .................................... 92/187 |
| 4,142,500 | * | 3/1979 | Davis ................................. 123/193 P |
| 4,830,589 | * | 5/1989 | Pareja .................................... 417/539 |
| 5,279,268 | * | 1/1994 | Brink et al. ........................ 123/197.2 |
| 6,178,873 | * | 1/2001 | Pierobon et al. ....................... 92/187 |

FOREIGN PATENT DOCUMENTS

512776 * 12/1937 (GB) .................................. 74/579 E

* cited by examiner

Primary Examiner—Vinh T. Luong
(74) Attorney, Agent, or Firm—David L. Kuhn; Gail S. Soderling; Clifford C. Carter

(57) ABSTRACT

An engine or other machine has an improved configuration for a connecting rod a wrist pin cradled and fastened on a saddle of the rod. The improved configuration allows fluid flow through the rod to the interior of the wrist pin while reducing the tendency for cracks in the saddle. The configuration includes a fastener which has a through bore and which extends from a void in the rod to the interior of the wrist pin. The fastener fits closely with holes in the wrist pin and the saddle, and a nut fixed in the wrist pin threads with the fastener, whereby the nut and fastener prevent relative motion between the wrist pin and the saddle. The saddle has only one aperture, so the saddle is stronger than prior designs.

10 Claims, 3 Drawing Sheets

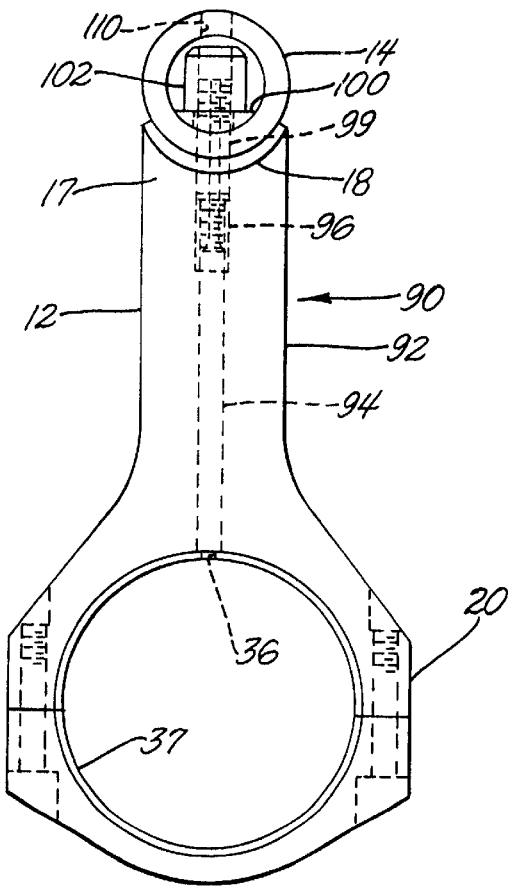
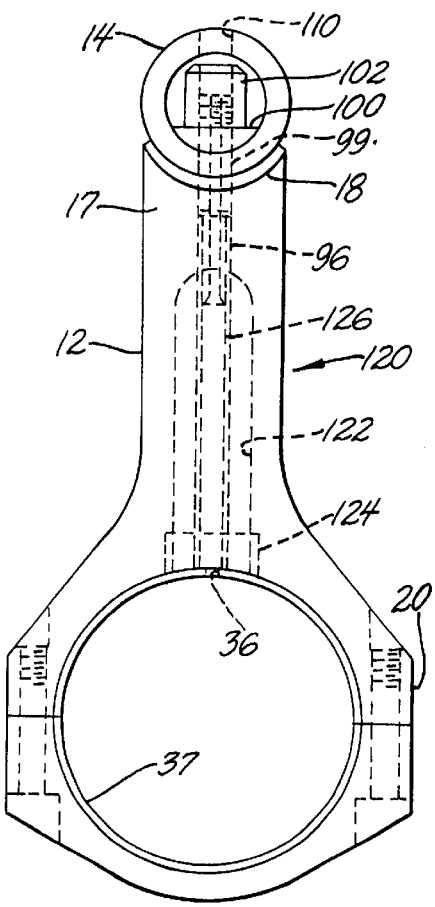
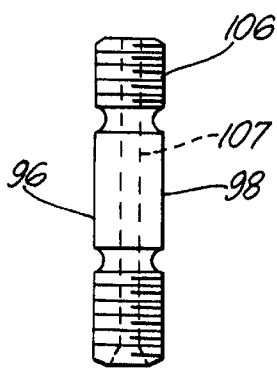
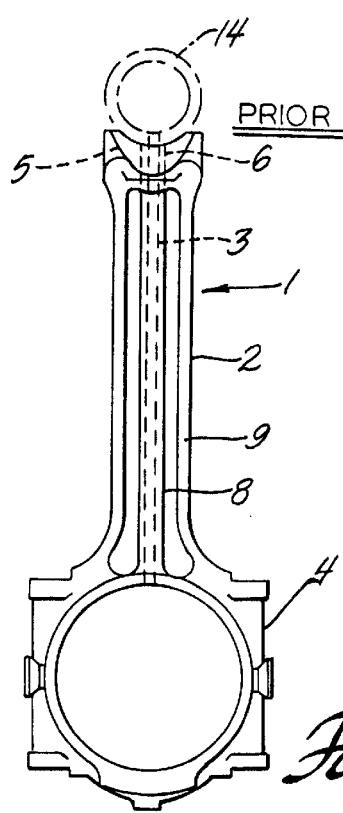
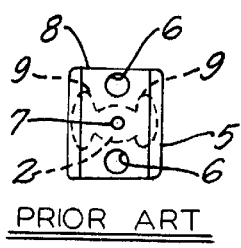

CONNECTING ROD STRUCTURE AND ATTACHMENT TO WRIST PIN

GOVERNMENT USE

The invention described here may be made, used and licensed by the or for the U.S. Government for governmental purposes without paying me any royalty.

BACKGROUND

It is well known in the art of constructing internal combustion engines to provide oil passages within components such as pistons, wrist pins and connecting rods so that oil flows from one component to another, whereby the components form part of a fluid circuit. The connections or interfaces between these components, particularly where the oil flows from one component to another, can be the source of mechanical design problems. A case in point is the connection between a wrist pin and connecting rod in which the connecting rod has a curved saddle affixed in surface contact to a wrist pin. A conventional connecting rod having such a saddle is shown at reference numeral 1 in FIG. 17. The connecting rod has a solid shaft 2 with through bore 3, a head 4 for engaging a crank pin (not shown) and a saddle 5 for engaging a wrist pin shown in phantom at 14. As can be seen in FIG. 18, shaft 2 has a generally "H" shaped cross section having a web 8 and flanges 9. Saddle 5 has an orifice 7 that registers with bore 3 and has a pair of bolt holes 6. Bolts (not shown) pass through holes 6 and engage pin 14 so that pin 14 and rod 1 are fixed together. As better seen in FIG. 18, saddle 5 has a total of three apertures, and the inventor herein believes that these holes contribute to the tendency for cracks to form in saddle 5 during engine operation.

SUMMARY

The invention is an improved assembly of a connecting rod and a wrist pin in an internal combustion engine or other item of machinery, wherein one feature of the assembly is a novel connection between the rod and the wrist pin. This connection is comprised of a threaded fastener such as a cap screw that passes through the connecting rod's saddle and into the wrist pin. The saddle has a single aperture, which accommodates the fastener. The use of a single aperture reduces the tendency for crack initiation and propagation in the saddle during engine operation. Threadingly receiving the fastener is a specially formed nut in conforming surface contact with the inner diametrical surface of the wrist pin. A through bore in the fastener communicates with a tube or chamber in the shaft of the connecting rod. The tube or chamber in turn communicates with an orifice in the connecting rod's head, which is at the opposite end of the connecting rod from the saddle. Oil or other fluid can enter the head and flow to the wrist pin or vice versa.

BRIEF DESCRIPTION OF THE DRAWINGS

FIG. 6 is a view taken along line 6—6 in FIG. 7.

FIGS. 10, 11 and 12 are front elevational views of alternate embodiments of the assembly of connecting rod with the wrist pin.

FIG. 15 is an enlarged view of a stud shown in FIGS. 12 and 16.

FIG. 16 is a front elevational view of still another alternate embodiment of the assembly of connecting rod with the wrist pin.

FIG. 17 is a side elevational view of a prior art connecting rod.

FIG. 18 is a top elevational view of the saddle and shaft of the prior art connecting rod.

DETAILED DESCRIPTION

Figure 1:
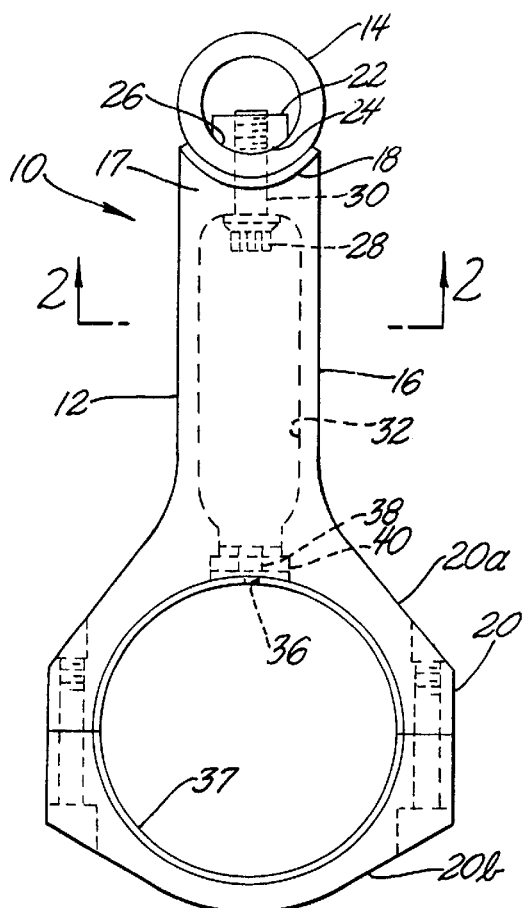
FIG. 1 is a front elevational view of the connecting rod of my invention as connected to a wrist pin.
Figure 2:
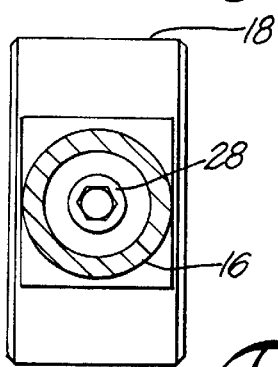
FIG. 2 is a view taken along line 2—2 in FIG. 1 with hidden lines removed.
Figure 4:
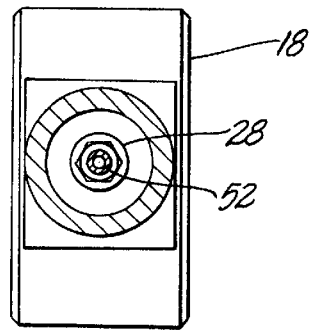
FIG. 4 is taken along line 4—4 in FIG. 3 with hidden lines removed.

In FIG. 1 is a first embodiment 10 of an improved configuration for a connecting rod 12 and the rod's connection with a wrist pin 14. Rod 12 comprises a known hollow shaft 16 having a saddle 18 at terminus 17 and a head 20. As seen in FIG. 2, shaft 16 has a circular cross section, but the cross section can be oval or square or otherwise regularly polygonal, or can approximate one of these shapes. Saddle 18 fits closely with the outer surface of wrist pin 14, and within the pin is a complementary nut 22 whose crown 24 fits closely to a portion 26 of the pin's inner surface. Nut 22 alternatively can be permanently fixed at its position within pin 14 or is an integral internally threaded boss of pin 14. A cap screw 28 protrudes through terminus 17 of shaft 16, through saddle 18, through the wall of wrist pin 14 and through nut 22. Wrist pin 14 and shaft 16 are fastened together solely via the threading engagement between cap screw 28 and nut 22.

Figure 5:
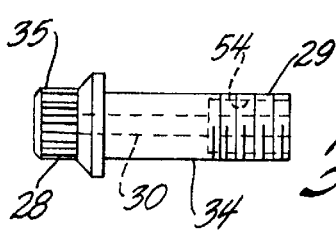
FIG. 5 is an enlarged view of the cap screw shown in FIGS. 1 and 3.

An enlarged view of cap screw 28 is shown in FIG. 5. As seen there, cap screw 28 has a through bore 30 which permits a fluid such as oil to flow from cavity 32 in shaft 16 to the interior of wrist pin 14 and vice versa. Cap screw 28 has a smooth round intermediate portion 34 that fits closely with terminus 17 and wrist pin 14, whereby cap screw 28 functions as a locating dowel to prevent axial movement of wrist pin 14 relative to connecting rod 12. One end of cap screw 28 has threads 29 that engage nut 22 and the opposite end of the screw has a head 35, which can, for example, be a 12-point wrenching head although other conventional heads can be employed.

Figure 8:
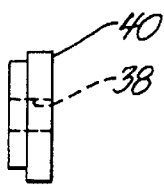
FIGS. 8 and 9 are enlarged views of a plug shown in FIG. 3.
Figure 9:
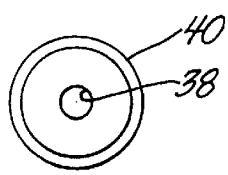

Split head 20 engages a crank pin (not shown) of an engine or a like element. Head 20 has halves 20a and 20b that are conventionally fastened together, as by bolts (also not shown). Within head 20 is a split bearing shell 37 having an orifice 36, which registers with passageway 38 through plug 40 at one end of cavity 32. Additionally or alternately to orifice 36, shell 37 may have a set of grooves (not shown) by which fluid in cavity 32 is communicated to the crank pin or other element encircled by head 20. Plug 40 is typically adhesively bonded in head half 20a after cap screw is passed through terminus 17 and pin 14 and threaded with nut 22. Separate views of plug 40 are shown in FIGS. 8 and 9. Plug 40 may also be shrink fitted, press fitted, or threaded into place.

Figure 3:
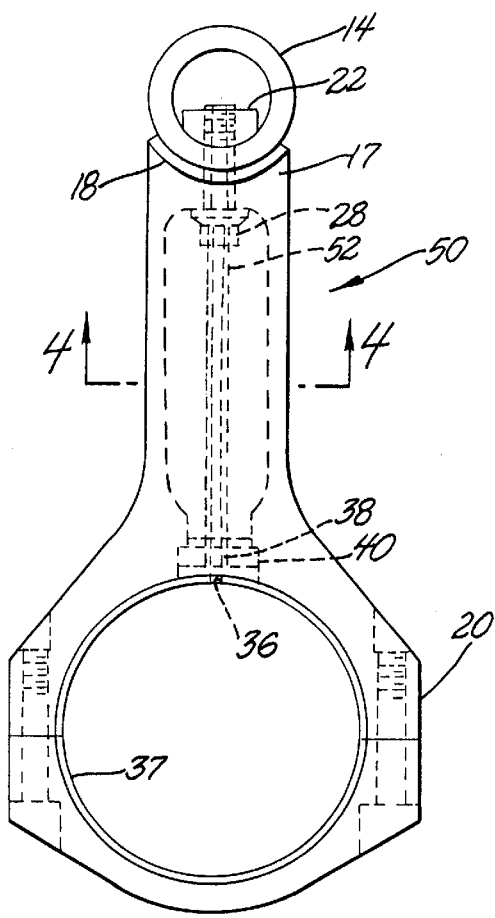
FIG. 3 is an alternate embodiment of the assembly shown in FIG. 1.
Figure 6:
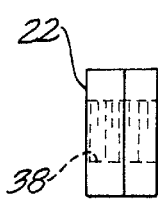
FIGS. 6 and 7 are enlarged view of a crowned nut shown in FIGS. 1 and 3.
Figure 7:
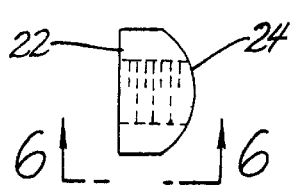

FIG. 3 shows a modified embodiment 50 of my invention that varies from embodiment 10 by virtue of a tube 52 fastened between cap screw 28 and plug 40 by any suitable means such as press fitting, brazing or adhesives. Also, one end of tube 52 can be threaded with a counter bore portion 54 of cap screw 28 (FIG. 5) and the other end of tube 52 can be threaded with passageway 38 of plug 40 (FIGS. 6 and 7). Tube 52 limits the mass of the oil within connecting rod 12 and it is contemplated that tube 52 and the oil therein have less mass than the oil filling cavity 32 if the tube is absent. Consequently, the tube reduces the rod's effective reciprocating mass during engine operation. Also, engine energy dissipation and heating of the oil due to splashing will be reduced.

Figure 10:
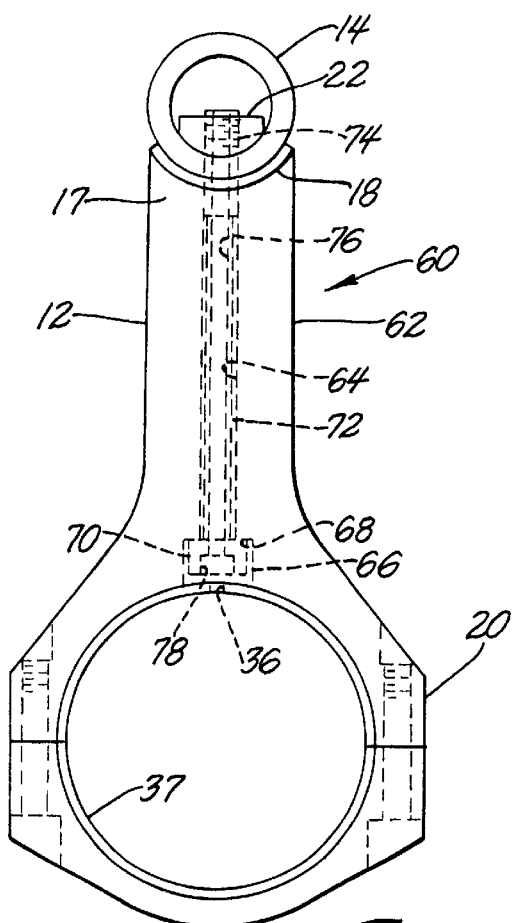
Figure 11:
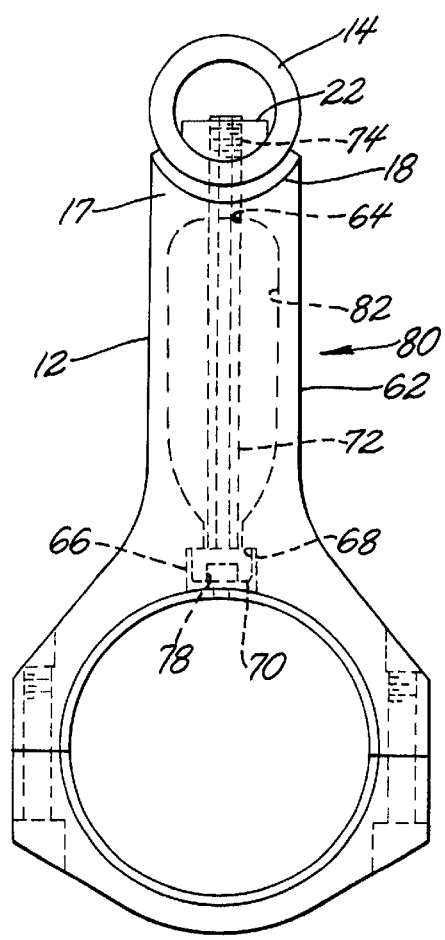

FIG. 10 shows another embodiment 60 of my configuration for a connecting rod 12 and the rod's connection with a wrist pin 14. In embodiment 60, connecting rod 12 has a solid shaft 62 through which extends an elongate bore 64 communicating with counter bore 66. Bolt 70 has its head in counter bore 66 and has a smooth shank 72 in elongate bore 64. A portion of shank 72 fits closely with terminus 17, saddle 18 and wrist pin 14 just as portion 34 of cap screw 28 fits with the same elements in FIG. 1. Likewise, bolt 70 has a threaded portion 74 that engages nut 22, and the bolt's head bears against shoulder 68 of counter bore 66. Bolt 70 defines a conduit 76 therethrough that opens into a step bore or polygonal well 78 in the bolt's head, whereby oil at orifice 36 can be conducted to the interior of wrist pin 14. FIG. 11 shows a slight variation 80 of embodiment 60 of FIG. 10. Specifically in FIG. 11, the mediate portion of bore 64 is expanded so as to form a cavity 82 similar to cavity 32 in FIG. 1.

Figure 13:
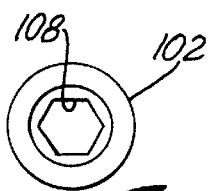
FIGS. 13 and 14 are top and side elevational views of a stud nut shown in FIGS. 12 and 16.
Figure 14:
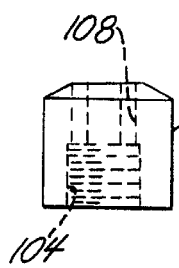

FIG. 12 shows another embodiment 90 of my configuration for a rod 12 and the rod's connection with a wrist pin 14. In embodiment 90, rod 12 has a solid shaft 92 through which extends an elongate bore 94. Permanently affixed in bore 94 at terminus 17 is stud 96, which is shown separately in FIG. 15. Stud 96 has a smooth, round intermediate portion 98 which fits closely with hole 99 in wrist pin 14 and with radiussed spacer 100 within the pin. Spacer 100 fits closely against the inner diametrical surface of wrist pin 14 in the same manner as nut 22 in FIG. 1. Spacer 100 can be permanently fixed within the wrist pin at hole 99 or be a boss integral with the wrist pin. A stud nut 102, shown also in FIGS. 13 and 14, has an internally threaded well 104 that engages threaded section 106 of stud 96. Nut 102 typically has a hexagonal drive socket 108, which can be accessed through orifice 110 in wrist pin 14 by the appropriate drive tool. Optionally, well 104 communicates with socket 108 and stud 96 has through bore 107, whereby oil entering bore 94 through orifice 36 can be admitted into wrist pin 14. FIG. 16 shows another optional variation 120 wherein connecting rod 12 is hollowed so as to have a blind cavity 122 and a plug 124 to close cavity 122. Tube 126 is connected between stud 96 and plug 124, which both have passages so that oil may enter and exit tube 126.

I wish it to be understood that I do not desire to be limited to the exact details of construction or method shown herein since obvious modifications will occur to those skilled in the relevant arts without departing from the spirit and scope of the following claims.

What is claimed is:

1. In a machine having a wrist pin, connecting rod and structure for connecting the rod and pin, an improved configuration for the pin, rod and structure, comprising:

the wrist pin;

a wrist pin hole in the wrist pin;

a nut within an interior of the wrist pin, the nut registering with the wrist pin hole;

the connecting rod;

a shaft of the connecting rod defining a void;

an engagement head of the connecting rod having an inner diametrical surface and a through hole communicating the void with the inner diametrical surface;

a terminus at one end of the shaft;

a curved saddle on the terminus in close surface contact with the wrist pin;

a single aperture in the saddle registering with the wrist pin hole, passing through the terminus and communicating with the void;

a fastener having a shank passing through, and fitting closely with, the single aperture and the wrist pin hole;

a threaded portion of the shank engaging the nut; and a bore extending through the fastener, the bore being part of a fluid flow path between the inner diametrical surface of the engagement head and the interior of the wrist pin.

2. The configuration of claim 1, further comprising:

a plug at an opposite end of the void from the terminus;

a plug aperture through the plug communicated to the through hole in the engagement head and communicated to the void;

a drive head of the fastener on the shank adjacent the terminus; and a tube connected between the drive head and the plug aperture.

3. The configuration of claim 2 wherein a portion of the shaft between the terminus and the engagement head is hollow.

4. The configuration of claim 2, further comprising a curved surface of the nut conformingly fit against the inner peripheral surface of the wrist pin.

5. The configuration of claim 2 wherein the nut is formed integrally with the wrist pin.

6. The configuration of claim 1, further comprising a curved surface of the nut conformingly fit against the inner peripheral surface of the wrist pin.

7. The configuration of claim 1 wherein the fastener extends completely through the shaft.

8. The configuration of claim 1 wherein the wrist pin hole is a first wrist pin hole and the configuration further comprises:

a drive head of the fastener within the wrist pin; and a second wrist pin hole axially aligned with the drive head.

9. In a machine having a wrist pin, connecting rod and structure for connecting the rod and pin, an improved configuration for the pin, rod and structure, comprising:

the wrist pin;

a fastener;

a fastener hole in the wrist pin;

a nut within an interior of the wrist pin on an inner peripheral surface thereof, the nut registering with the fastener hole;

the connecting rod;

a shaft of the connecting rod defining a void;

an engagement head of the connecting rod having an inner diametrical surface and a through hole communicating the void with the inner diametrical surface;

a terminus at one end of the shaft;

a curved saddle on the terminus in close surface contact with the wrist pin;

a single aperture in the saddle registering with the fastener hole, passing through the terminus and communicating with the void;

a fastener having a shank passing through, and fitting closely with, the single aperture and the fastener hole;

a threaded portion of the shank engaging the nut; and a bore extending through the fastener, the bore being part of a fluid flow path between the inner diametrical surface of the engagement head and the interior of the wrist pin.

10. In a machine having a wrist pin, connecting rod and structure for connecting the rod and pin, an improved configuration for the pin, rod and structure, comprising:

the wrist pin;

a fastener;

a wrist pin hole in the wrist pin;

a nut within an interior of the wrist pin on an inner peripheral surface thereof, the nut registering with the wrist pin hole;

the connecting rod;

a shaft of the connecting rod;

a terminus at one end of the shaft;

a curved saddle on the terminus in close surface contact with the wrist pin;

a single aperture in the saddle registering with the wrist pin hole;

a fastener having a shank passing through, and fitting closely with, the single aperture and the wrist pin hole; and a threaded portion of the shank engaging the nut.

* * * * *